US010296689B2

(12) United States Patent
Bakshi et al.

(10) Patent No.: US 10,296,689 B2
(45) Date of Patent: *May 21, 2019

(54) AUTOMATED BOTTOM-UP AND TOP-DOWN PARTITIONED DESIGN SYNTHESIS

(71) Applicant: Synopsys, Inc., Mountain View, CA (US)

(72) Inventors: Smita Bakshi, Los Gatos, CA (US); Kenneth S. McElvain, Los Altos, CA (US); Gael Paul, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 14/322,905

(22) Filed: Jul. 2, 2014

(65) Prior Publication Data
US 2015/0012898 A1    Jan. 8, 2015

Related U.S. Application Data

(63) Continuation of application No. 13/330,628, filed on Dec. 19, 2011, now abandoned, which is a continuation of application No. 10/387,802, filed on Mar. 13, 2003, now Pat. No. 8,082,138.

(60) Provisional application No. 60/372,211, filed on Apr. 11, 2002.

(51) Int. Cl.
G06F 17/50    (2006.01)

(52) U.S. Cl.
CPC ........ *G06F 17/505* (2013.01); *G06F 17/5045* (2013.01); *G06F 2217/06* (2013.01); *G06F 2217/84* (2013.01)

(58) Field of Classification Search
None
See application file for complete search history.

(56) References Cited

U.S. PATENT DOCUMENTS

| 5,812,417 A | 9/1998 | Young |
| 5,841,663 A | 11/1998 | Sharma et al. |
| 6,108,494 A | 8/2000 | Eisenhofer et al. |
| 6,131,182 A | 10/2000 | Beakes et al. |

(Continued)

OTHER PUBLICATIONS

Batra et al. "Hcompare: A Hierarchical Netlist Comparison Program", 1992, 29th ACM/IEEE Design Automation conference pp. 299-304.

(Continued)

*Primary Examiner* — Kamini S Shah
*Assistant Examiner* — Iftekhar Khan
(74) *Attorney, Agent, or Firm* — HIPLegal LLP; Judith Szepesi

(57) ABSTRACT

An embodiment of the present invention includes a partitioner, a synthesizer, and an optimizer. The partitioner partitions a design into a hierarchy of partitions having a top-level partition and lower partitions. The lower partitions include a bottom-level partition. The top-level partition has top-level constraints. The synthesizer synthesizes the lower partitions hierarchically from the bottom-level partition to create lower partition netlists based on the top-level constraints. The optimizer optimizes a top-level netlist corresponding to the top-level partition from the lower partition netlists to satisfy the top-level constraints.

20 Claims, 11 Drawing Sheets

(56) References Cited

U.S. PATENT DOCUMENTS

| | | | | |
|---|---|---|---|---|
| 6,145,117 A * | 11/2000 | Eng | ............... | G06F 17/5045 716/105 |
| 6,170,080 B1 | 1/2001 | Ginetti et al. | | |
| 6,189,131 B1 | 2/2001 | Graef et al. | | |
| 6,295,636 B1 * | 9/2001 | Dupenloup | ......... | G06F 17/5045 716/103 |
| 6,360,356 B1 | 3/2002 | Eng | | |
| 6,421,818 B1 | 7/2002 | Dupenloup et al. | | |
| 6,421,828 B1 * | 7/2002 | Wakisaka | ........... | H04N 5/44543 348/E5.105 |
| 6,438,735 B1 | 8/2002 | McElvain et al. | | |
| 6,671,866 B2 * | 12/2003 | Arsintescu | ......... | G06F 17/5068 716/124 |
| 6,711,729 B1 * | 3/2004 | McElvain | ........... | G06F 17/5045 716/105 |
| 6,865,726 B1 * | 3/2005 | Igusa | ................. | G06F 17/5045 700/97 |
| 7,047,162 B1 | 5/2006 | Wever et al. | | |
| 8,082,138 B1 * | 12/2011 | Bakshi | ................. | G06F 17/5045 703/14 |
| 8,365,113 B1 * | 1/2013 | Bhardwaj | ............. | G06F 17/505 716/104 |
| 8,640,066 B1 * | 1/2014 | Gupta | ................... | G06F 17/505 716/102 |
| 9,026,978 B1 * | 5/2015 | Liu | ...................... | G06F 17/505 716/132 |
| 2003/0079192 A1 * | 4/2003 | Cheong | ............... | G06F 17/5072 716/113 |
| 2003/0084416 A1 * | 5/2003 | Dai | .................... | G06F 17/5045 716/55 |
| 2009/0106724 A1 * | 4/2009 | Arsovski | ............... | G06F 17/505 716/115 |
| 2010/0218146 A1 * | 8/2010 | Platzker | ................ | G06F 17/505 716/103 |
| 2010/0235799 A1 * | 9/2010 | Rice | .................... | G06F 17/5068 716/118 |
| 2011/0029299 A1 * | 2/2011 | Zhu | ..................... | G06F 17/5022 703/14 |

OTHER PUBLICATIONS

Patil et al. "Efficient Circuit Partitioning Algorithms for Parallel Logic Simulation", 1989, Proceedings for the Supercomputing Conference, 10 pages.

Wever et al. "Parallel Transient Analysis for Circuit Simulation", IEEE, 1996, Proceedings of the 29th Annual Hawaii International Conference on System Sciences, pp. 442-447.

* cited by examiner

AUTOMATED BOTTOM-UP AND TOP-DOWN PARTITIONED DESIGN SYNTHESIS

The present application is a continuation of U.S. application Ser. No. 13/330,628, filed on Dec. 19, 2011, which claims priority to U.S. application Ser. No. 10/387,802, filed on Mar. 13, 2003, which is now U.S. Pat. No. 8,082,138, issued on Dec. 20, 2011, which claims priority to U.S. Provisional Application Ser. No. 60/372,211, filed on Apr. 11, 2002, and incorporates those applications in their entirety.

BACKGROUND

Field

Embodiments of the invention relate to the field of computer-aided design, and more specifically, to design synthesis.

Background

Currently, synthesis tools have problems synthesizing designs larger than a few million gates. In order to synthesize designs larger than a few million gates, users manually partition the design into smaller segments, and then constrain and synthesize each partition separately. All the partitions are linked together to construct the final design. This is commonly referred to as bottom-up synthesis. It is a manual, time-consuming and inefficient process requiring the creation and maintenance of several design projects via scripts. This "traditional" bottom-up flow suffers from the following problems: (1) scripting is complex and error prone, (2) constraints for design partitions must be complete and accurate, (3) boundary optimization is inhibited across partition boundaries, (4) name collisions between shared design partitions cause flow problems, (5) modeling the timing of the design partition for the top-level synthesis is complex, and (6) keeping track of incremental design changes is manual and error prone Most critical yet error-prone among the various manual tasks is the process of determining constraints for each of the partitions. Incorrect constraint budgeting leads to poor quality of results since synthesis tools do not optimize across the boundary of the partitions and are forced to work with the sub-optimal constraints.

When there is a change in one of these design partitions, using currently available synthesis tools, it is the user's responsibility to keep track of the changes and re-synthesize only the partitions that changed. Alternatively, the synthesis tool will re-synthesize the complete design. Both these solutions are undesirable because of the manual effort involved and the long runtimes incurred by complete, rather than incremental, synthesis.

Therefore, there is a need to have an efficient technique to improve design synthesis of digital circuits.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention includes a partitioner, a synthesizer, and an optimizer. The partitioner partitions a design into a hierarchy of partitions having a top-level partition and lower partitions. The lower partitions include a bottom-level partition. The top-level partition has top-level constraints. The synthesizer synthesizes the lower partitions hierarchically from the bottom-level partition to create lower partition netlists based on the top-level constraints. The optimizer optimizes a top-level netlist corresponding to the top-level partition from the lower partition netlists to satisfy the top-level constraints.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
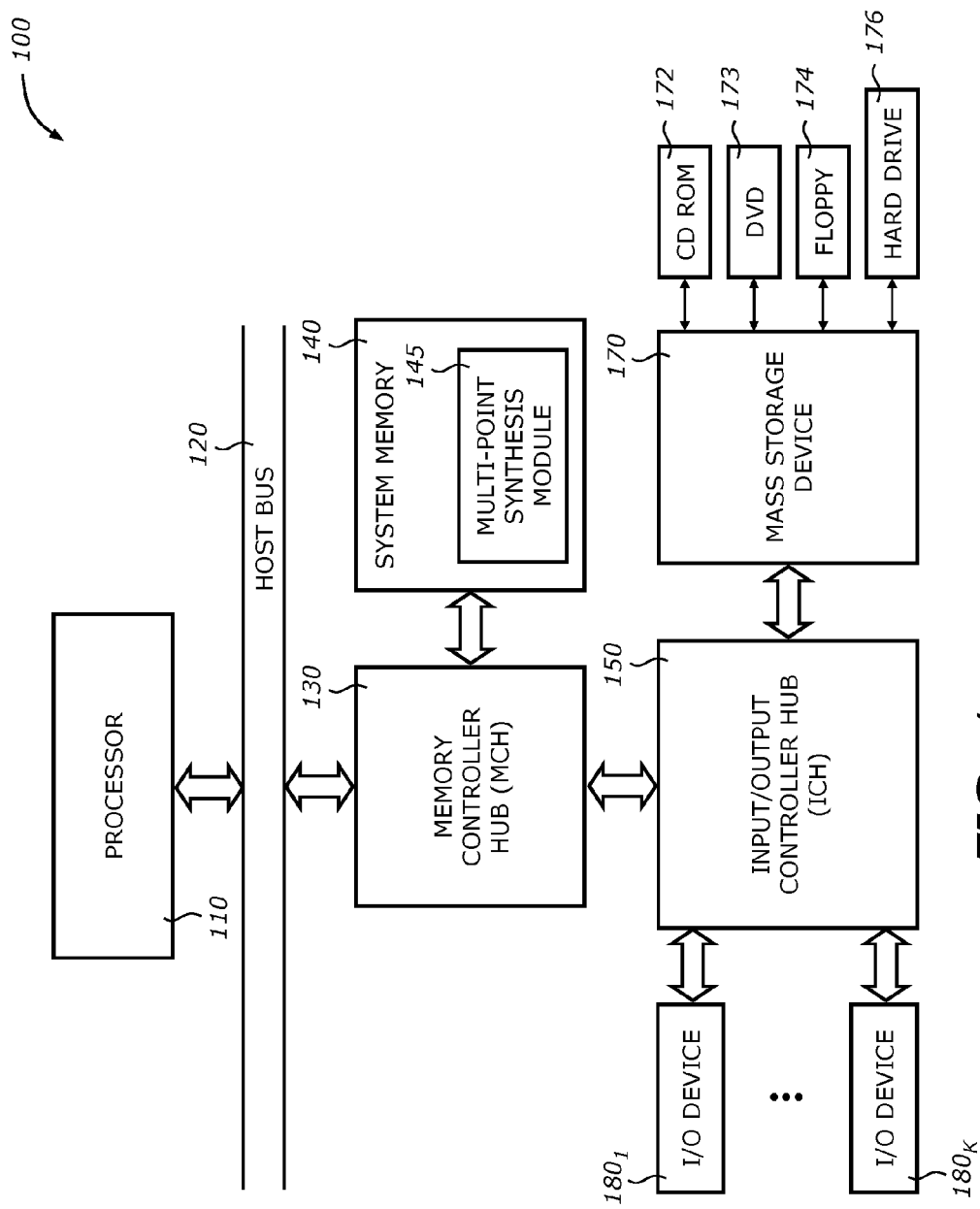
FIG. 1 is a diagram illustrating a system in which one embodiment of the invention can be practiced.

FIG. 1 is a diagram illustrating a system 100 in which one embodiment of the invention can be practiced. The system 100 includes a host processor 110, a host bus 120, a memory control hub (MCH) 130, a system memory 140, an input/output control hub (ICH) 150, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to a peripheral bus. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a multi-point synthesis module 145. The multi-point synthesis module 145 may be used as part of a design process for Applications Specific Integrated Circuit (ASIC) devices, programmable device such as programmable logic devices (PLD), complex PLD (CPLD), field programmable logic array (FPGA), etc. Any one of the elements of the multi-point synthesis module 145 may be implemented by hardware, software, firmware, microcode, or any combination thereof. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-accessible media. The machine-accessible media may contain computer readable program code to perform tasks as described in the following.

The I/O devices 180$_1$ to 180$_K$ may include any I/O devices to perform I/O functions. Examples of I/O devices 180$_1$ to 180$_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, microprogrammed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
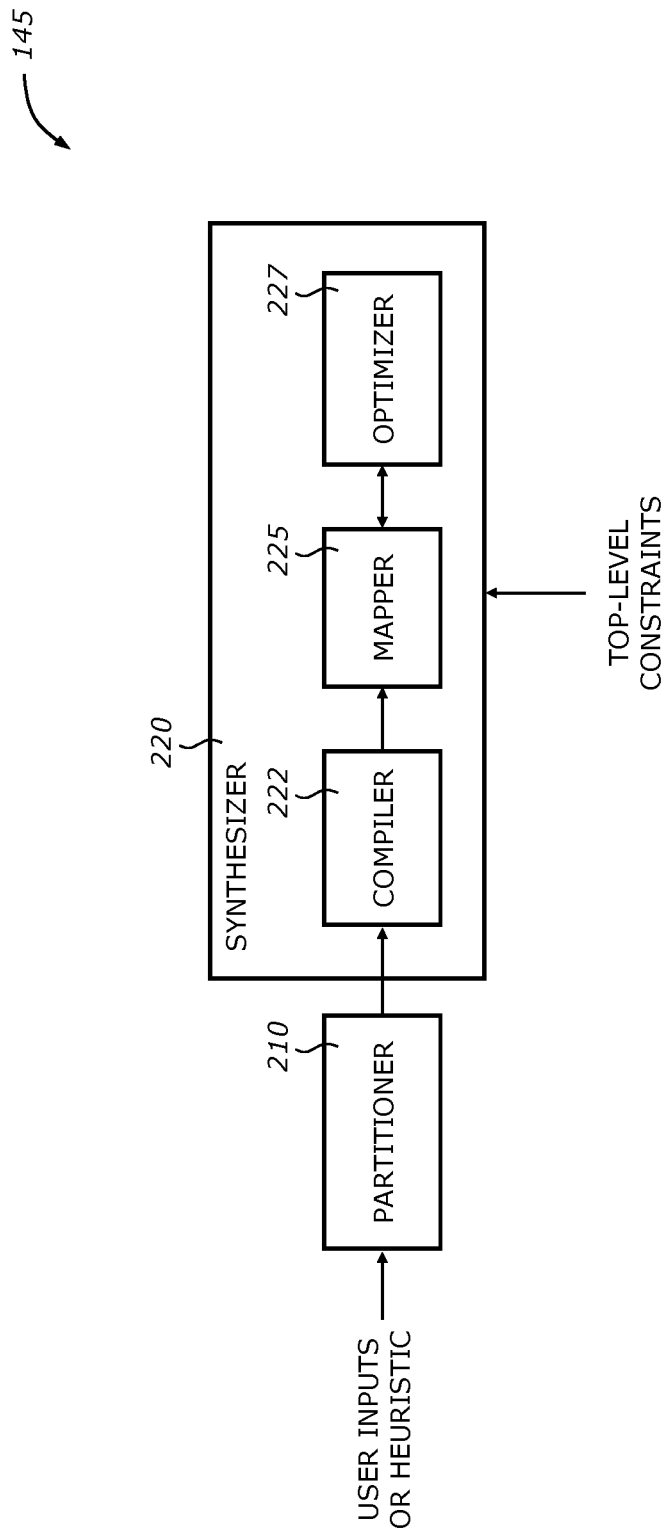
FIG. 2 is a diagram illustrating a multi-point synthesis module according to one embodiment of the invention.

FIG. 2 is a diagram illustrating the multi-point synthesis module 145 shown in FIG. 1 according to one embodiment of the invention. The multi-point synthesis module 145 includes a partitioner 210, and a synthesizer 220.

The partitioner 210 partitions a design project, a design, or a circuit into a hierarchy of partitions using either user-provided partitions or some heuristic if the user-provided partitions are not available.

The synthesizer 220 receives the top-level constraints and synthesizes the partitions in a hierarchical manner, from the bottom-level partitions to the top-level partition. The synthesizer 220 divide or budget the top-level constraints into lower partition constraints. The synthesizer 220 includes a compiler 222, a mapper 225, and an optimizer 227. The compiler 222 generates a register transfer level (RTL) netlist from a hardware description language (HDL) text file input. The compiler 222 compiles a source program containing a HDL circuit description. The HDL may be any appropriate HDL such as Very High Speed Integrated Circuit Hardware Description Language (VHDL) or Verilog. The mapper 225 receives the RTL netlist and constraints to generate a gate-level netlist. The mapper 225 generates technology-specific gate level circuit description from the post-partition RTL circuit description and other useful information from the library (not shown). The synthesizer 220 performs a bottom-up synthesis, replacing a parent partition with its lower level synthesized netlists. As the synthesizer 220 progresses from the bottom up, the optimizer 227 optimizes the partition based on the partition constraints. The optimizer 227 also optimizes the top-level partition to satisfy the top-level constraints.

Typically, a design process may go through several design cycles, passes, or iterations. At each pass, the user may modify the circuit description, the constraints, or the interface model of a partition. When the design is modified or changed, the synthesizer 220 only re-synthesizes those partitions that contain a change. This allows incremental synthesis.

The multi-point synthesis module 145 provides many useful features including (1) time budgeting by optimizing top level connecting RTL netlists, (2) using netlist comparison to detect change instead of using file time stamps, (3) providing optimizable gate-level interface logic modules (ILM's).

The advantages of the multi-point module 145 include: (1) designer productivity is increased thanks to the automating bottom-up synthesis; users do not need to write scripts to manage the bottom up flow; (2) design performance and designer productivity are increased by automating time budgeting; (3) design performance is increased by allowing boundary optimizations across partitions or compile points; (4) stability across design cycles or passes is increased by automatically detecting changes in partitions or compile points and only re-compiling those compile points that have changed; and (5) significantly large designs can be synthesized in a completely automated manner thanks to the top-down partitioned flow.

Figure 3:
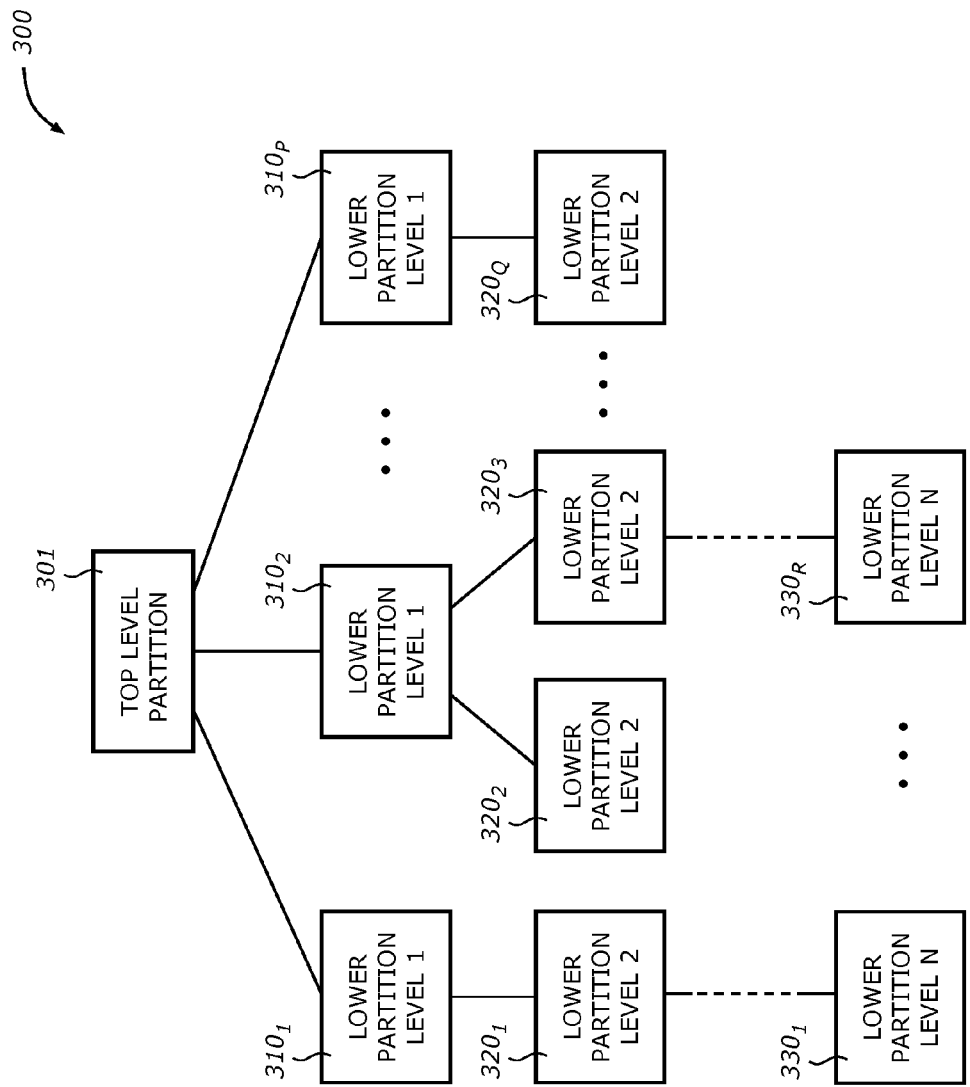
FIG. 3 is a diagram illustrating a partitioning according to one embodiment of the invention.

FIG. 3 is a diagram illustrating a partitioning 300 according to one embodiment of the invention. The partitioning 300 includes a hierarchy of partitions organized as a tree. The partitioning 300 includes a top-level partition 301 and lower partitions $310_i$, $320_j$, and $330_k$.

The top-level partition 301 represents the overall design project or the entire circuit. The top-level partition 301 has top-level constraints such as timing parameters (e.g., propagation delays), gate complexity, types of logic elements, etc. The lower partitions $310_1$ to $310_P$ represent the partition level 1. The lower partitions $320_1$ to $320_Q$ represent the partitions at level 2, etc. The lower partitions $330_1$ to $330_R$ represent the bottom-level partitions or the partitions level N. As is known by one skilled in the art, the number of levels may be any number greater than 1.

Each of a lower partition has a parent partition. For example, the lower partition $320_2$ has the lower partition $310_2$ as its parent. A lower partition typically has one parent, while a parent may have more than one child. For example, the parent partition $310_2$ has two child partitions $320_2$ and $320_3$.

The lower partitions may be synthesized separately and independently. This aspect makes effective use of multiprocessing to speed up the synthesis process. The lower partitions may be allocated and assigned to a group of processors. If there are more partitions than the number of processors, the partitions may be grouped in groups such that the synthesis run time of the longest group is minimized.

Figure 4:
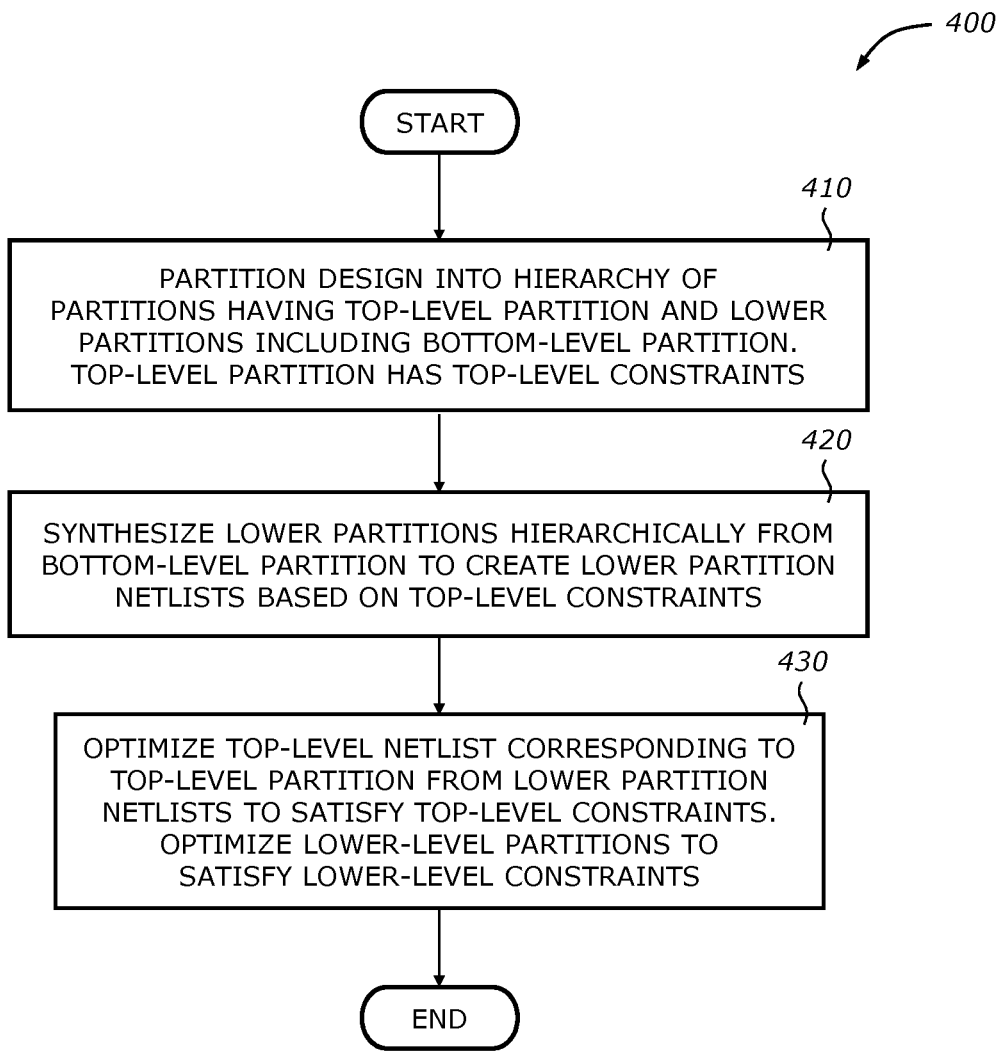
FIG. 4 is a flowchart illustrating a process to synthesize according to one embodiment of the invention.

FIG. 4 is a flowchart illustrating a process 400 to synthesize according to one embodiment of the invention. The process 400 in essence implements the multi-point synthesis module 145 shown in FIG. 2.

Upon START, the process 400 partitions the design into a hierarchy of partitions (Block 410). The hierarchy of partitions includes a top-level partition and lower partitions. The lower partitions include at least a bottom-level partition. The top-level partition has top-level constraints as described above. The details of Block 410 will be described in FIG. 5.

Next, the process 400 synthesizes the lower partitions hierarchically from the bottom-level partition up to the top-level partition to create lower partition netlists based on the top-level constraints (Block 420). The details of Block 420 will be described in FIG. 6. Then, the process 400 optimizes the top-level netlist corresponding to the top-level partition to satisfy the top-level constraints and every compile point (CP) at lower level partitions to satisfy the corresponding partition constraints (Block 430) and is then terminated.

Figure 5:
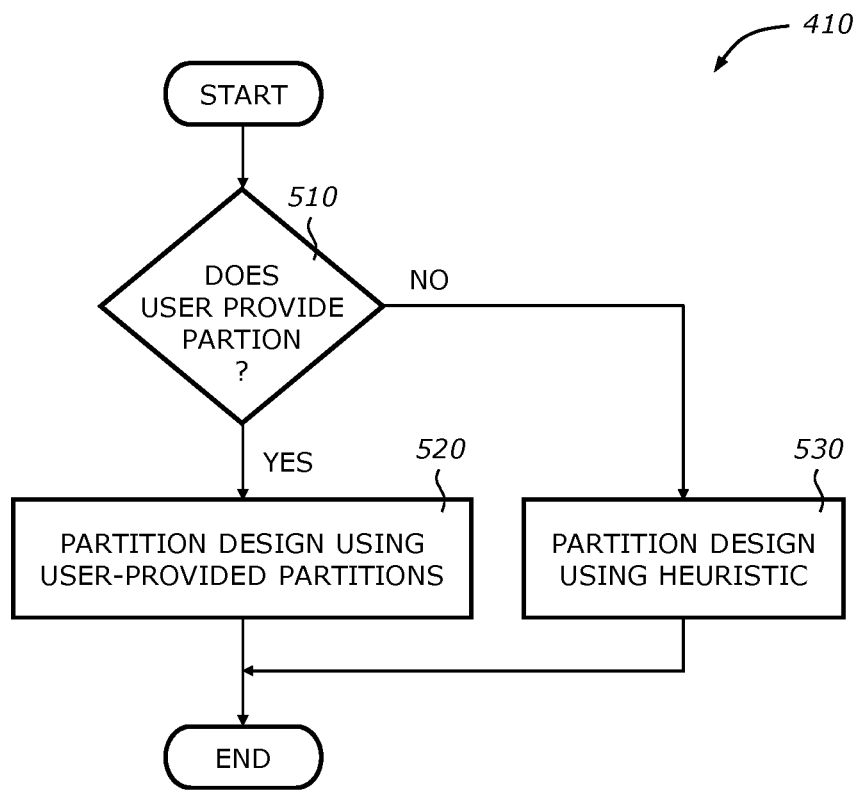
FIG. 5 is a flowchart illustrating a process to partition according to one embodiment of the invention.

FIG. 5 is a flowchart illustrating the process 410 to partition according to one embodiment of the invention.

Upon START, the process 410 determines if the user provide the partitions (Block 510). The user may provide partitions in a number of ways such as HDL circuit descriptions, schematic diagrams, etc. If so, the process 420 partitions the design using the user-provided partitions (Block 520) and is then terminated. Otherwise, the process 420 partitions the design using a heuristic or some criteria (Block 530). Examples of the heuristic or criteria include size of blocks, frequency of occurrences of blocks, etc. Then, the process 420 is terminated.

Figure 6:
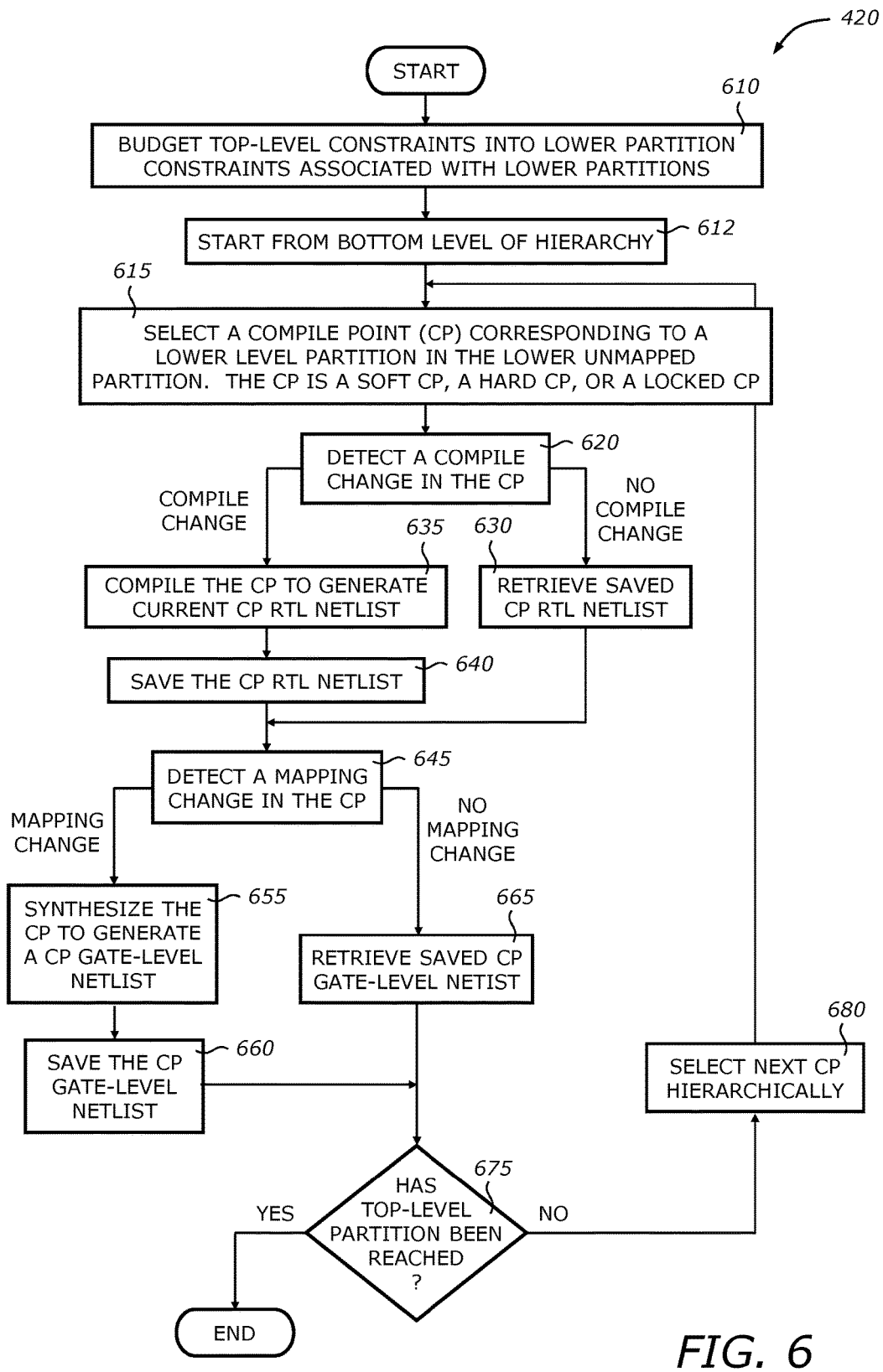
FIG. 6 is a flowchart illustrating a process to synthesize lower partitions according to one embodiment of the invention.

FIG. 6 is a flowchart illustrating the process 420 to synthesize lower partitions according to one embodiment of the invention.

Upon START, the process 420 budgets the top-level constraints into the lower partition constraints associated with the lower partitions (Block 610). The details of Block 610 will be described in FIG. 7. Then, the process 420 starts from a bottom-level of the hierarchy (Block 612). Next, the process 420 selects a compile point (CP) corresponding to a lower level partition in the unmapped lower partitions (Block 615). The CP may be a soft CP, a hard CP, or a locked CP. The CP may also be designated to inherit the property of another CP to be one of soft, hard, and locked CP. The designation of the type of the CP may be provided by the user or in case of absence of user inputs, a default type may be selected.

Next, the process 420 detects a compile change in the CP (Block 620). A compile change is a change in compilation. The details of Block 620 will be described in FIG. 8. The process 420 then determines if there is a compile change in the CP. If there is no compile change, the process 420 retrieves a previously saved CP RTL netlist (Block 630) and proceeds to Block 645. If there is a compile change, the process 420 compiles the CP to generate a current CP RTL netlist (Block 635). Next, the process 420 saves the CP RTL netlist in memory or mass storage (Block 640) which can be retrieved in a subsequent design cycle or pass if there is no compile change.

Then, the process 420 detects a mapping change in the CP (Block 645). A mapping change is a change in netlist during mapping. The details of Block 645 will be described in FIG. 9. Next, the process determines if there is a mapping change in the CP. If there is no mapping change, the process 420 retrieves the saved CP gate-level netlist corresponding to the CP (Block 665) and proceeds to Block 670. If there is a mapping change, the process 420 maps the CP to generate a CP gate-level netlist (Block 655). Next, the process 420 saves the CP gate-level netlist in memory or mass storage (Block 660) which can be retrieved in a subsequent design cycle or pass if there is no mapping change.

Next, the process 420 determines if the top-level partition has been reached (Block 675). If so, the process 420 is terminated. Otherwise, the process 420 selects a next CP hierarchically (Block 680) and proceeds to Block 615.

Figure 7:
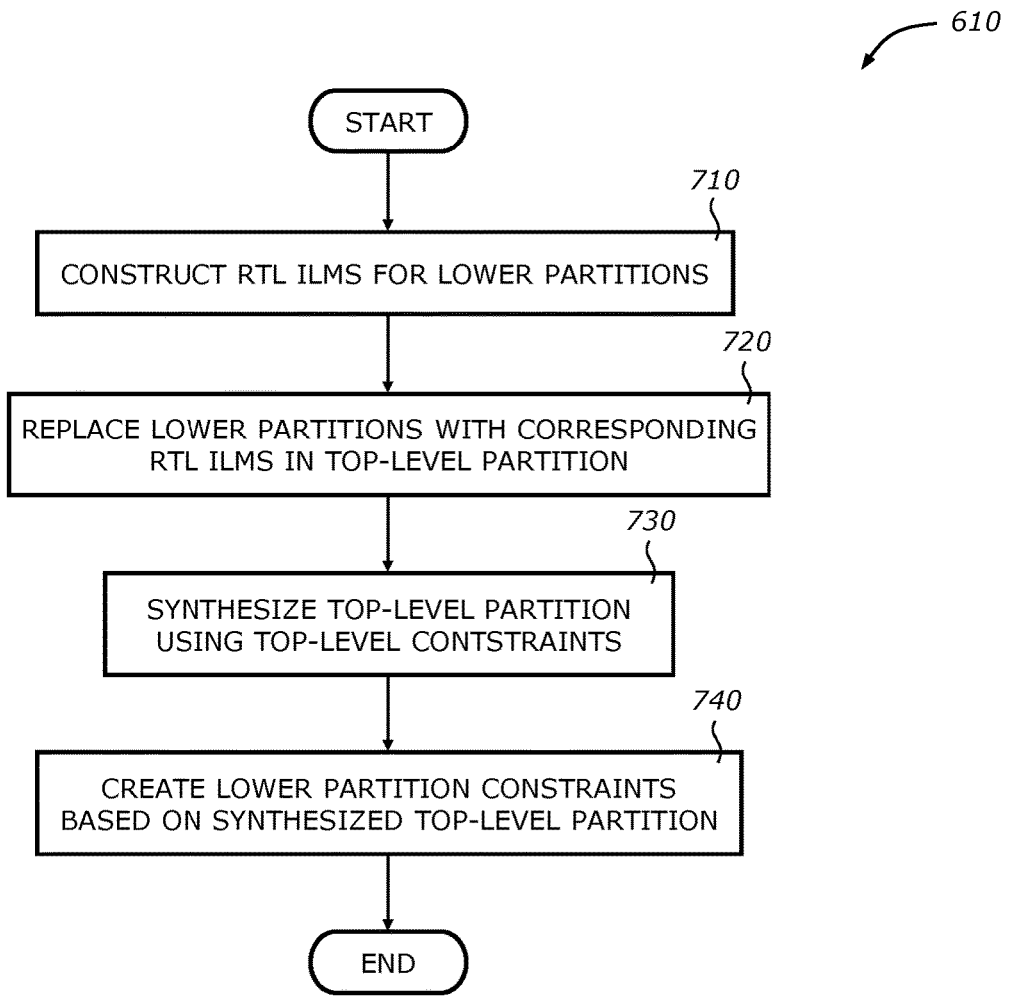
FIG. 7 is a flowchart illustrating a process to budget top-level constraints according to one embodiment of the invention.

FIG. 7 is a flowchart illustrating the process 610 to budget top-level constraints according to one embodiment of the invention.

Upon START, the process 610 constructs a RTL Interface logic module (ILM) for each of the lower partitions (Block 710). The construction of the RTL ILM is in essence similar to the gate-level ILM described in FIG. 11. All gate-level components have a timing model. A RTL ILM is constructed by first constructing a timing model for each of the RTL primitives. Then, the method described in FIG. 11 can be used to create the RTL ILMs. Next, the process 610 replaces the lower partitions with the corresponding RTL ILMs in the top-level partition (Block 720). Then, the process 610 synthesizes the top-level partition using the top-level constraints (Block 730). Next, the process 610 creates the lower partition constraints based on the synthesized top-level partition (Block 740) and is then terminated.

Figure 8:
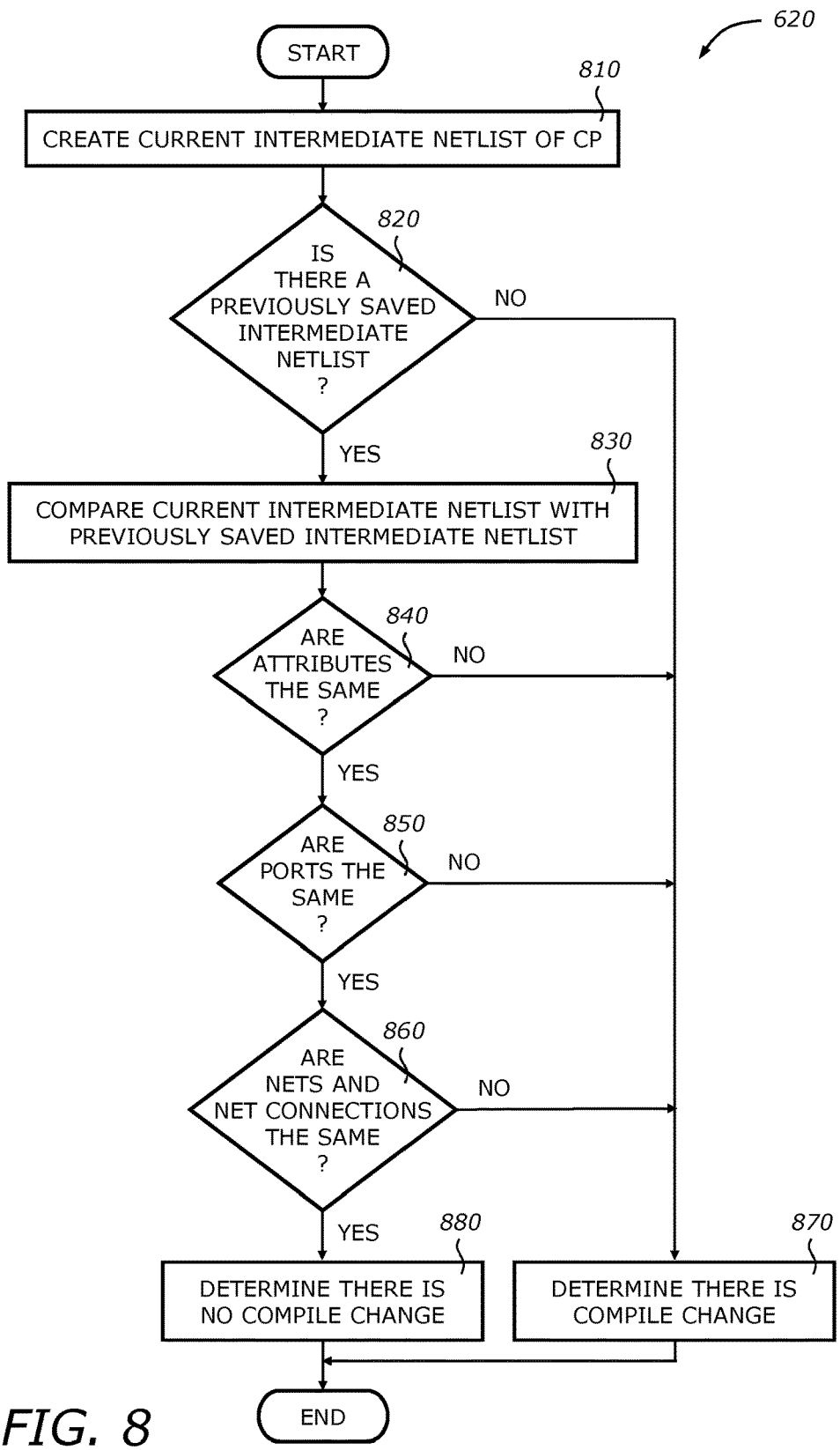
FIG. 8 is a flowchart illustrating a process to detect a compile change according to one embodiment of the invention.

FIG. 8 is a flowchart illustrating the process 620 to detect a compile change according to one embodiment of the invention.

Upon START, the process 620 creates a current intermediate netlist of the CP (Block 810). The intermediate netlist is an internal representation of the CP. This intermediate netlist is not yet an RTL netlist. For example, flip-flops may not have been inferred yet. Next, the process 620 determines if there is a previously saved intermediate netlist (Block 820). If not, the process 620 proceeds to Block 870. Otherwise, the process 620 compares the current intermediate netlist with a previously saved intermediate netlist (Block 830).

Next, the process 620 determines if the attributes or properties of the CP are the same (Block 840). If not, the process 620 proceeds to Block 870. Otherwise, the process 620 determines if the ports of the CP are the same (Block 850). If not, the process 620 proceeds to Block 870. Otherwise, the process 620 determines if the nets and the net connections of the CP are the same (Block 860). If not, the process 620 determines or declares that there is a compile change (Block 870) and is then terminated. Otherwise, the process 620 determines or declares that there is no compile change (Block 880) and is then terminated.

Figure 9:
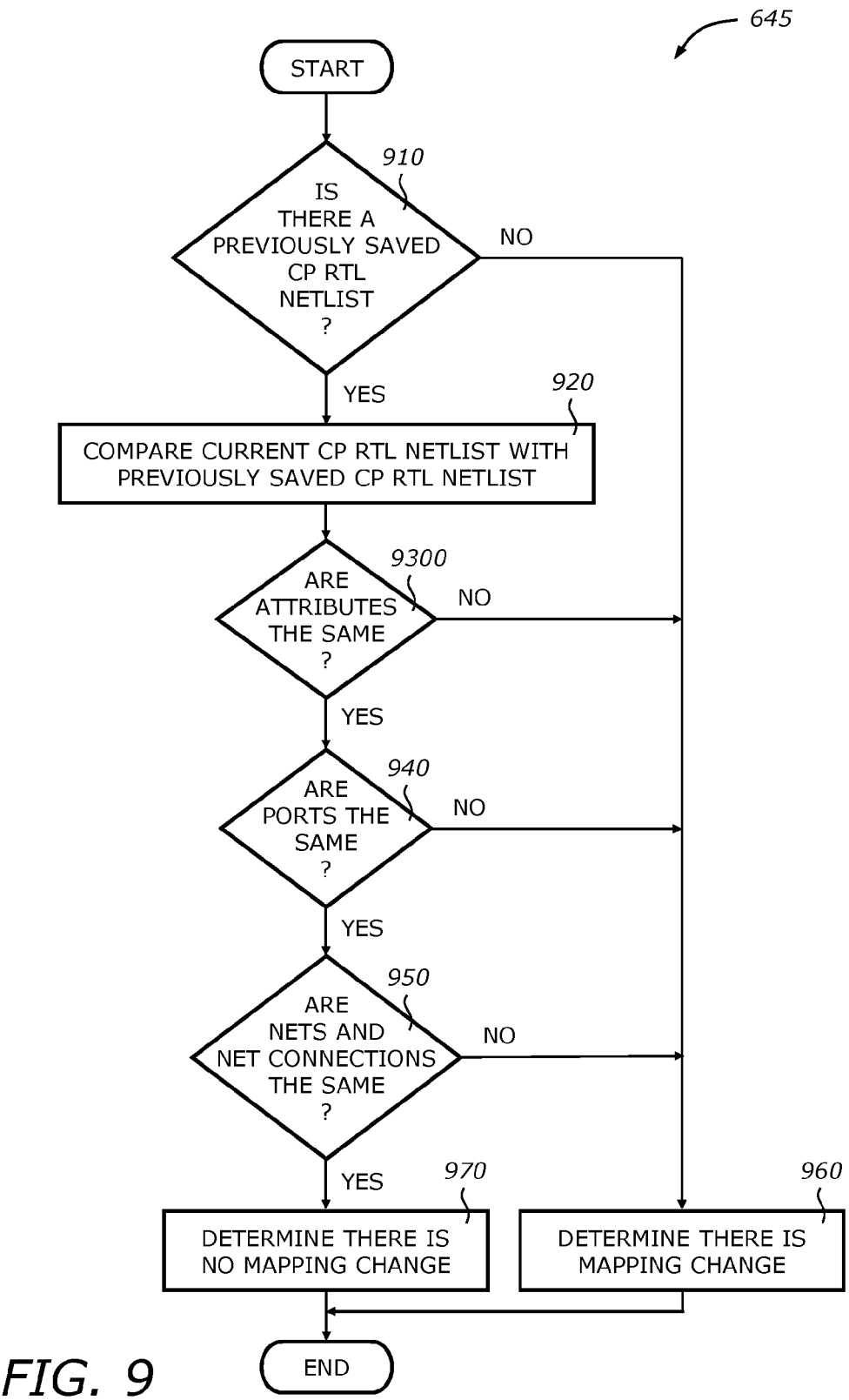
FIG. 9 is a flowchart illustrating a process to detect a mapping change according to one embodiment of the invention.

FIG. 9 is a flowchart illustrating the process 645 to detect a mapping change according to one embodiment of the invention.

Upon START, the process 645 determines if there is a previously saved CP RTL netlist (Block 910). If not, the process 645 proceeds to Block 960. Otherwise, the process 645 compares the current CP RTL netlist with the previously saved CP RTL netlist (Block 920).

Next, the process 645 determines if the attributes or properties (e.g., constraints and optimization directives) of the CP are the same (Block 930). If not, the process 645 proceeds to Block 960. Otherwise, the process 645 determines if the ports of the CP are the same (Block 940). If not, the process 645 proceeds to Block 960. Otherwise, the process 645 determines if the nets and the net connections of the CP are the same (Block 950). If not, the process 620 determines or declares that there is a mapping change (Block 960) and is then terminated. Otherwise, the process 645 determines or declares that there is no mapping change (Block 970) and is then terminated.

Figure 10:
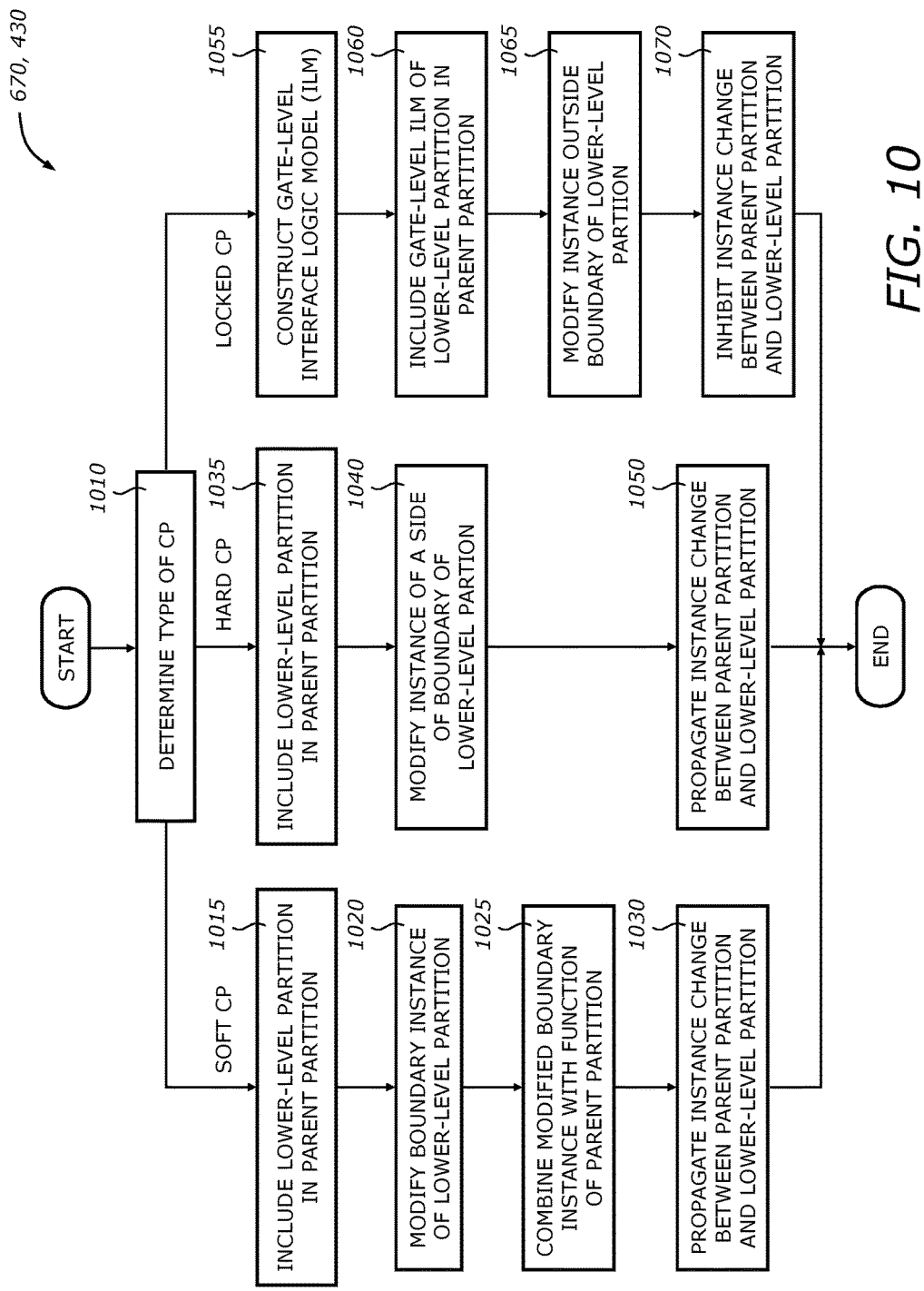
FIG. 10 is a flowchart illustrating a process to optimize a CP or partition according to one embodiment of the invention.

FIG. 10 is a flowchart illustrating the process 430 to optimize a CP or partition according to one embodiment of the invention.

Upon START, the process 430 determines the type of the CP (Block 1010). The CO may be a soft CP, a hard CP, or a locked CP.

If it is a soft CP, the process 430 includes the lower level partition in the parent partition (Block 1015). Then, the process 430 modifies a boundary instance of the lower-level partition (Block 1020) if necessary. Next, the process 430 combines the modified boundary instance with a function of the parent partition (Block 1025). Then, the process 430 propagates instance changes between the parent partition and the lower-level partition (Block 1030) and is then terminated. In other words, changes can propagate in both directions; from the parent partition to the lower-level partition and from the lower-level partition to the parent partition. The instance changes are to optimize the partition including sizing, buffering, local gate collapse, and pin swapping.

If it is a hard CP, the process 430 includes the lower level partition in the parent partition (Block 1035). Then, the process 430 modifies an instance of a side of the boundary of the lower-level partition (Block 1040). The side can be either side (outside or inside) of the boundary. Then, the process 430 propagates instance changes between the parent partition and the lower level partition (Block 1050) and is then terminated. The direction of the instance changes and the optimization are similar to the soft CP.

If it is a locked CP, the process 430 first constructs a gate-level interface logic module (ILM) (Block 1055). Then, the process 430 includes the gate-level ILMs of the lower partitions in the parent partition (Block 1060). Next, the process 430 modifies the instance outside the boundary of the lower level partitions (Block 1065). Then, the process 430 inhibits instance changes between parent partition and the lower level partition (Block 1070) and is then terminated. The term "locked" indicates that all instances of the lower partition are to remain identical and unaffected by the top-level constraints or critical paths. Changes neither propagate into nor out of a locked CP. This type of CP is useful for obtaining stable results for a completed part of the design. It is also expected that the locked CP and the hard CP are used for the partitions that are intended to go to place and route separately.

Figure 11:
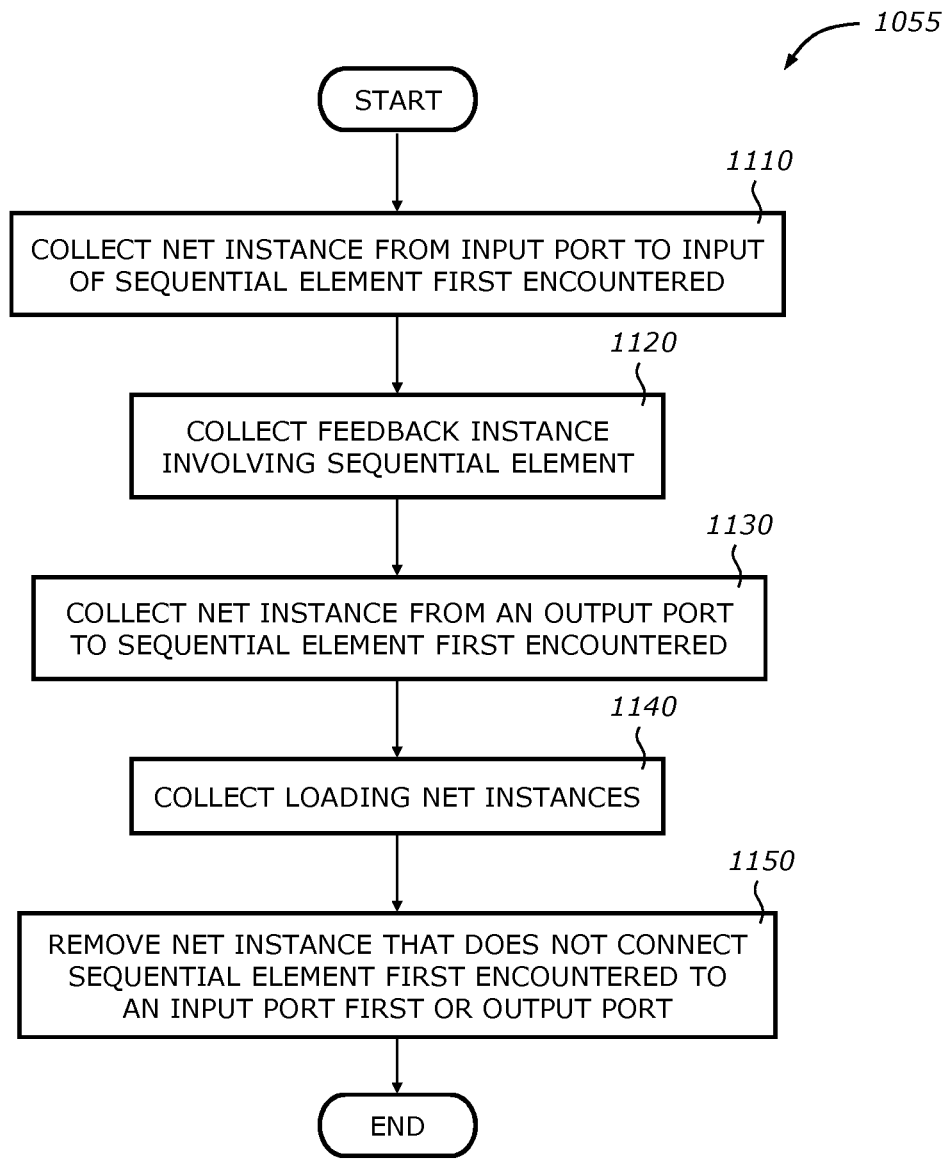
FIG. 11 is a flowchart illustrating a process to construct a gate-level interface logic module according to one embodiment of the invention.

FIG. 11 is a flowchart illustrating the process 1055 to construct a gate-level interface logic module according to one embodiment of the invention.

Upon START, the process 1055 collects all the net instances from an input port to input of sequential elements first encountered (Block 1110). Next, the process 1055 collects all the feedback instances involving those sequential elements (Block 1110). Then, the process 1055 collects all net instances from an output port to sequential elements first encountered (Block 1130).

Next, the process 1055 collects all the loading net instances involving sequential elements first encountered as traversed from an input or output ports (Block 1040). The loading net instances may provide loading factor that may affect the timing. Then, the process 1055 removes all the net instances that do not connect the sequential element first encountered on paths to an input or output port (Block 1150) and is then terminated.

The process for the top-level optimizer is in essence similar to the process for the lower partition optimizer except that the top-level partition is now the parent partition. The lower level partitions include the partitions that are next below the top level partition and that have been traversed upward from the bottom-level partition(s). The constraints used in the optimization process are the constraints corresponding to the partitions.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method, performed by a computer executing instructions stored in a memory, comprising:
    partitioning a circuit design into a plurality of hierarchical partitions in the memory, the partitions having a top-level partition and one or more lower-level partitions wherein the lowest-level partitions are bottom-level partitions, the top-level partition having top-level constraints; and
    synthesizing the lower partitions, in the memory, from the bottom-level partition using the top-level constraints adapted to the bottom-level partitions for a bottom-up synthesis of the hierarchical partitions, wherein the synthesizing comprises:
        compiling the lower partitions separately to create register transfer level (RTL) netlists having lower partition constraints, wherein the lower-level partition constraints are determined by dividing or budgeting top-level constraints associated with the top-level partition, and
        mapping the RTL netlists to gate-level netlists associated with the lower partitions using the lower partition constraints.

2. The method of claim 1, the bottom-up synthesis further comprising:
    synthesizing bottom-level partitions using lower-level partition constraints to create a synthesized netlist for each bottom-level partition.

3. The method of claim 2, the bottom-up synthesis further comprising:
    replacing a parent partition with the synthesized netlist for bottom-level partitions associated with the parent partition as child partitions.

4. The method of claim 1, wherein divided or budgeted top-level constraints are associated with more than one lower-level constraint.

5. The method of claim 1, wherein upon receipt of an update to the circuit design, re-synthesizing only partitions affected by the update to the circuit design within the bottom-up synthesis of the hierarchical partitions.

6. An article of manufacture for performing circuit synthesis, comprising instructions stored on a non-transitory computer readable medium, the instructions comprising:
    a compiler configurable to generate an RTL netlist upon receiving an HDL file input;
    a mapper configurable to compile a source program containing an HDL circuit description; and
    an optimizer configurable to generate a gate-level netlist upon receipt of the RTL netlist and a set of one or more constraints;
    the synthesizer performing a bottom up synthesis, replacing a parent partition with a gate-level netlist obtained from synthesis of its child partitions, the synthesizer further configurable to determine the set of one or more constraints by dividing or budgeting top-level constraints.

7. The synthesis system of claim 6, the optimizer further configurable to optimize a top-level partition to satisfy the top-level constraints.

8. The synthesis system of claim 6 further comprising:
    a partitioner configurable to partition one or more of a design project, a design, and a circuit into a hierarchy of partitions.

9. The synthesis system of claim 8 further comprising:
    a comparator configurable to identify the partitions associated with changes to the one or more of the design project, the design, and the circuit.

10. The synthesis system of claim 9, the synthesizer further configurable to re-synthesize only those partitions identified as changed by the comparator.

11. A method of performing synthesis, performed by a computer executing instructions stored in a memory, the method comprising:
    partitioning one or more of a design project, a design, and a circuit into a hierarchy of partitions, the hierarchy of partitions having a top-level partition and one or more lower-levels, the one or more lower-levels having one or more level partitions, wherein a lowest-level includes one or more bottom-level partitions, wherein the top-level partition has one or more associated top-level constraints;
    determining one or more lower-level partition constraints from the one or more top-level constraints, wherein the lower-level partition constraints are determined by dividing or budgeting top-level constraints associated with the top-level partition; and
    synthesizing the bottom-level partitions using lower-level partition constraints associated with the bottom-level partitions to create a synthesized netlist for each bottom-level partition, wherein the synthesizing comprises:
        compiling the lower partitions separately to create register transfer level (RTL) netlists having lower partition constraints, wherein the lower-level partition constraints are determined by dividing or budgeting top-level constraints associated with the top-level partition, and
        mapping the RTL netlists to gate-level netlists associated with the lower partitions using the lower partition constraints.

12. The method of claim 11 further comprising:
replacing each of one or more parent partitions in a level of partitions above associated child partitions in the bottom-level partitions with the synthesized netlist of the associated child partition.

13. The method of claim 12 further comprising:
synthesizing partitions in the level of partitions above the bottom-level partitions unassociated with child partitions in the bottom-level partitions to create a synthesized netlist for each partition.

14. The method of claim 11, the synthesizing further comprising:
compiling a source program containing an HDL description into an RTL netlist.

15. The method of claim 14, the synthesizing further comprising:
mapping the RTL netlist and one or more lower-level partition constraints into a gate-level netlist.

16. The method of claim 11, the synthesizing further comprising:
optimizing the synthesized netlist for each bottom-level partition based on the lower-level partition constraints.

17. The method of claim 11 further comprising:
determining changes in the one or more of a design project, a design, and a circuit; and
re-synthesizing bottom-level partitions associated with the changes.

18. The method of claim 11 wherein the determining one or more lower-level partition constraints further comprises:
dividing or budgeting the one or more top-level constraints.

19. The method of claim 1 wherein the synthesizing further comprises:
selecting, a compile point (CP) corresponding to a partition of the lower level partitions that does not have an associated mapped RTL netlist.

20. The method of claim 19, further comprising:
detecting a mapping change in the CP during the mapping.

* * * * *